(12) United States Patent
Ritchey et al.

(10) Patent No.: US 6,227,072 B1
(45) Date of Patent: May 8, 2001

(54) LIGHT WEIGHT BICYCLE PEDAL

(75) Inventors: Thomas W. Ritchey, Palo Alto; Johannes Schneeberger, San Francisco, both of CA (US)

(73) Assignee: Ritchey Designs, Inc., Redwood City, CA (US)

( * ) Notice: Subject to any disclaimer, the term of this patent is extended or adjusted under 35 U.S.C. 154(b) by 0 days.

(21) Appl. No.: 09/165,753

(22) Filed: Oct. 2, 1998

(51) Int. Cl.[7] .................................................. G05G 1/14
(52) U.S. Cl. ........................ 74/594.6; 74/594.4; D12/125
(58) Field of Search ............................... 74/594.4, 594.6; 36/131; D12/125

(56) References Cited

U.S. PATENT DOCUMENTS

| | | | | |
|---|---|---|---|---|
| D. 286,995 | * | 12/1986 | Pai ........................................ | D12/125 |
| D. 387,706 | * | 12/1997 | Hanamura ............................ | D12/125 |
| D. 414,723 | * | 10/1999 | Hanamura ............................ | D12/125 |
| 5,195,397 | * | 3/1993 | Nagano ................................ | 74/594.4 |
| 5,259,270 | * | 11/1993 | Lin ....................................... | 74/594.6 |
| 5,279,184 | * | 1/1994 | Ogino .................................. | 36/131 X |
| 5,575,184 | * | 11/1996 | De Schrijver ....................... | 74/594.6 |
| 5,697,262 | * | 12/1997 | Chen ................................... | 74/594.6 |
| 5,868,043 | * | 2/1999 | Ueda ................................... | 74/594.6 |
| 5,992,266 | * | 11/1999 | Heim ................................... | 74/594.6 |

FOREIGN PATENT DOCUMENTS

0619219 A1 * 10/1994 (EP) ..................................... 74/594.6

* cited by examiner

Primary Examiner—Vinh T. Luong
(74) Attorney, Agent, or Firm—Gray Cary Ware & Freidenrich, LLP (57) ABSTRACT

A bicycle pedal is described that is more easy to engage and disengage and that has a hollowed out central section to prevent debris build-up. The bicycle pedal has a pedal body rotatably supported by a pedal shaft wherein the pedal body has planar pedal surfaces and a pivotable clamp member generally perpendicular to the surfaces of the pedal wherein the clamp member comprises a central contact surface and a clamp located at a lengthwise end of the clamp member. The clamp member extends out from a surface plane of the pedal for clamping to a cleat and the clamp also has a slideable guided surface acting in an arc-like way to perform a jaw-like movement. The bicycle pedal also has an urging device disposed against the clamp member such that it contacts a central contact surface of the clamp member and urges the clamp member inwards.

14 Claims, 7 Drawing Sheets

LIGHT WEIGHT BICYCLE PEDAL

FIELD OF THE INVENTION

The present invention relates to a bicycle pedal arranged for attaching the cleat of a shoe thereto. The bicycle pedal has the advantage of being particularly light in weight.

BACKGROUND OF THE INVENTION

Designs for various bicycle pedals exist which allow a cleat which is attached to the bottom of a shoe to be engaged by the pedal. This allows the motion of the shoe moving up and down to be translated to the pedal while keeping the shoe and pedal in contact. One common design utilizes two cleat retaining members. One of the cleat retaining members for cleat attachment is fixed and immovable. The other cleat retaining member is movable. A bias is applied to the movable cleat member so that some force is required to move it sufficiently to allow the engagement or disengagement of a cleat. Such designs generally employ a helical spring member to apply a bias to the movable cleat retaining member. Alternative designs have resulted in pedals having an eccentric camming unit which connects to a stud projecting from the bicycle rider's shoe, or a piece of the cleat extends into an recessed area in the pedal surface and is affixed to the pedal by means of the bias force created by a circular spring wire. In another alternative the pedal has a centrally located mushroom or T-shaped extension which protrudes from the surface of the pedal and engages a shoe cleat by means of a spring wire.

Although the above-described pedal designs are an improvement over pedals requiring clips or toe cages, a certain amount of care is required in positioning the cleat for proper engagement with the pedal, and the amount of force required for engagement is relatively high. In addition, most of the currently available cleat-engaging pedals are relatively bulky and heavy, necessitating the use of more energy by the rider to propel the bicycle forward. Furthermore, the solid filled-in structure of the current designs allows mud and other debris to build up between the cleat and the pedal, making engagement of the cleat more difficult and clogging the cleat engagement mechanism. A need exists for a simple, lightweight clipless pedal that allows the rider to easily and securely engage a shoe cleat with the pedal without it also becoming too readily disengaged and resists clogging. The present invention addresses this need.

SUMMARY OF THE INVENTION

The present invention provides a bicycle pedal comprising a pedal body rotatably supported by a pedal shaft, the pedal body having planar pedal surfaces; a pivotable clamp member generally perpendicular to the surfaces of the pedal, the clamp member comprising a central contact surface and a clamping means located at a lengthwise end of the clamp member which extends out from a surface plane of the pedal for clamping to a cleat, the clamping means further providing a slideable guided surface acting in an arc-like way to perform a jaw-like movement; and urging means disposed against the clamp member such that it contacts the central contact surface of the clamp member for urging the clamp member inwards.

The bicycle pedal of the invention has the advantage of being light in weight and requires less precision and force for a cleat to be attached thereto. The ease with which a cleat can be engaged or disengaged is particularly advantageous in bicycle pedals intended for use with mountain bicycles, as riders typically engage and disengage from the pedals relatively frequently.

The present invention additionally provides a bridge spring for use as an urging means in a bicycle pedal. The bridge spring of the invention has a distinct advantage over the helical springs used in the art as it will not, for example, become clogged with dirt during use.

DESCRIPTION OF A PREFERRED EMBODIMENT OF THE INVENTION

Figure 1:
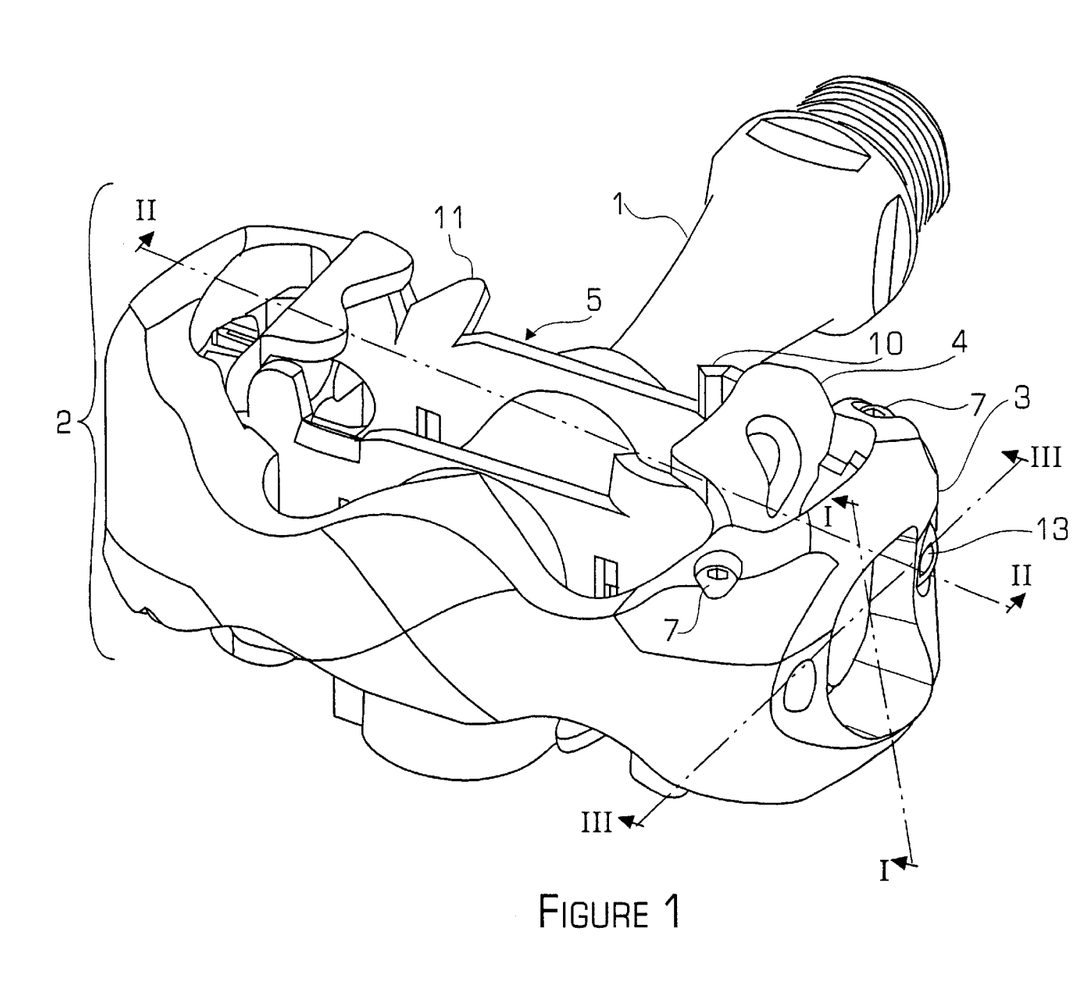
FIG. 1 is a perspective view of the pedal of the present invention.

Preferred embodiments of the present invention are shown in the accompanying figures. As shown in FIG. 1, the pedal of the invention is comprised of a pedal shaft 1 which supports a pedal body 2 which is capable of rotation about the pedal shaft 1. The pedal body is comprised of a housing 3 which surrounds one or more pivotable clamp members 4 used to attach a shoe cleat to the pedal. The clamp member (s) rest on frame members 5 along concentric guiding surfaces 14. Tension is applied to the clamp member(s) by an urging means 6.

The housing 3 is intended to protect the working parts of the pedal, and, therefore, is generally of a size and shape just sufficient to accomplish this goal. A preferred shape is generally rectangular as this is the shape of the frame members 5. It is preferably constructed of a light weight material, such as, for example, a light weight metal (titanium, aluminum, and the like),a plastic, and the like. The housing 3 is generally composed of several interlocking parts which are secured via several, generally at least two, mounting screws 7.

The clamp members 4 are comprised of clamping means 8 at one or both lengthwise ends of the clamp member and a central contact surface 9. In a preferred embodiment, the central contact surface 9 is arch-shaped and oriented generally parallel to the pedal surface. Preferably a clamp member is a single unit, and is oriented generally perpendicular to the planar surfaces 20 of the pedal body. The clamping means 8 extends out from a surface plane of the pedal body, providing for the clamping of a bicycle shoe cleat to the pedal. The embodiment illustrated by the Figures and described in detail herein features clamp members which extend from both pedal surfaces. It would be appreciated by those of skill in the art, however, that the scope of the invention includes a pedal having clamp members which extend from a single surface.

In a preferred embodiment, the clamp members preferably have clamping means at both lengthwise ends which extend out from the plane of opposite pedal surfaces. The clamping means generally curve in the direction of the pedal shaft 1 when the pedal is fully assembled, forming an about 45 degree angle or less, and may be notched at the end.

Figure 2:
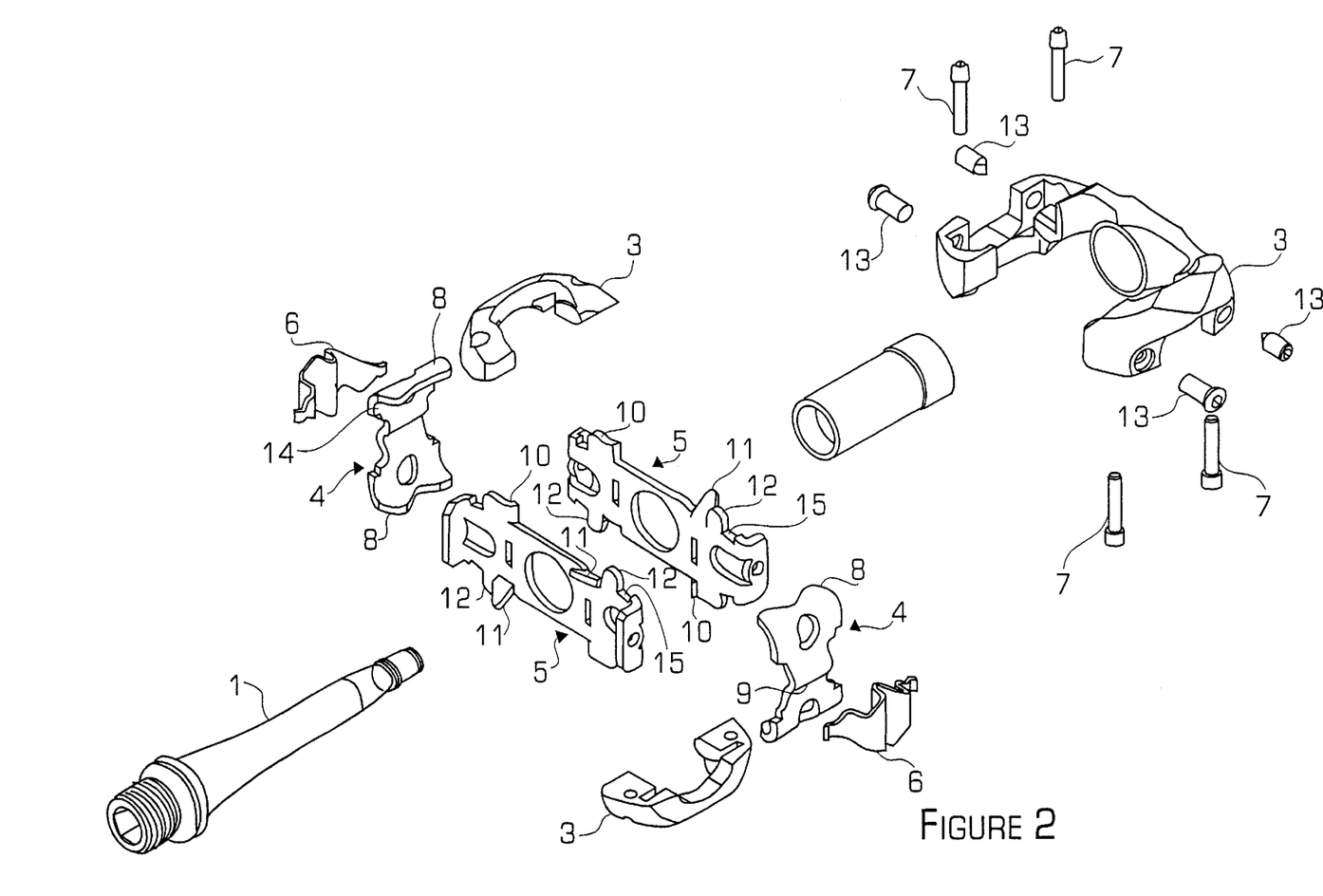
FIG. 2 an exploded perspective view of the parts comprising a preferred embodiment of the invention.
Figure 3:
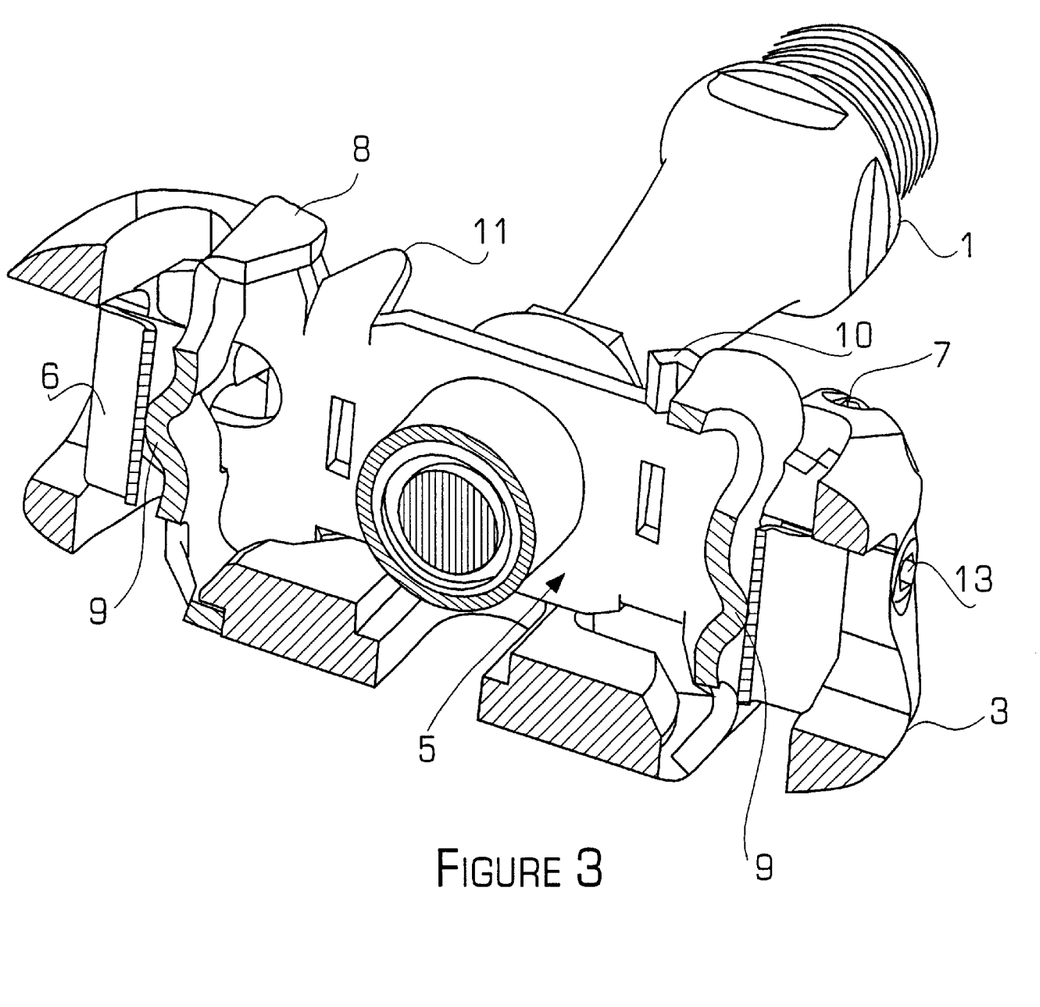
FIG. 3 is another perspective view of the pedal; along the line 3—3 of FIG. 1.

The clamp members 4 may be pivotable, by which it is meant that they are not fixed to other parts of the pedal but are allowed to pivot in either a side to side or back and forth motion in relation to the frame members 5. The clamp members are disposed against either end of the frame members wherein the curved portion of the clamping means rests on an extending pivot-arc 12 of the frame members. As the clamp pivots, the glide surfaces 14 slide in a guided manner along the frame contact surfaces 15 that are concentric with the opposing extending pivot-arc. The frame members, as seen in FIG. 2, may be generally rectangular in shape. The lengthwise ends of each frame member generally curve in an outward direction, which is in toward the bicycle to which the pedal has been attached in the case of the inner frame member, or away from the bicycle in the case of the outer frame member.

Each frame member may have two distinct cleat contact points, the lever members 10 in the front of the pedal and resist members 11 at the rear of the pedal. By "front" of the pedal it is meant the end of the pedal closest to a rider's toe when a shoe is attached to the pedal. By "back" of the pedal it is mean the end of the pedal closest to a rider's heel when a shoe is attached to a pedal.

Figure 6:
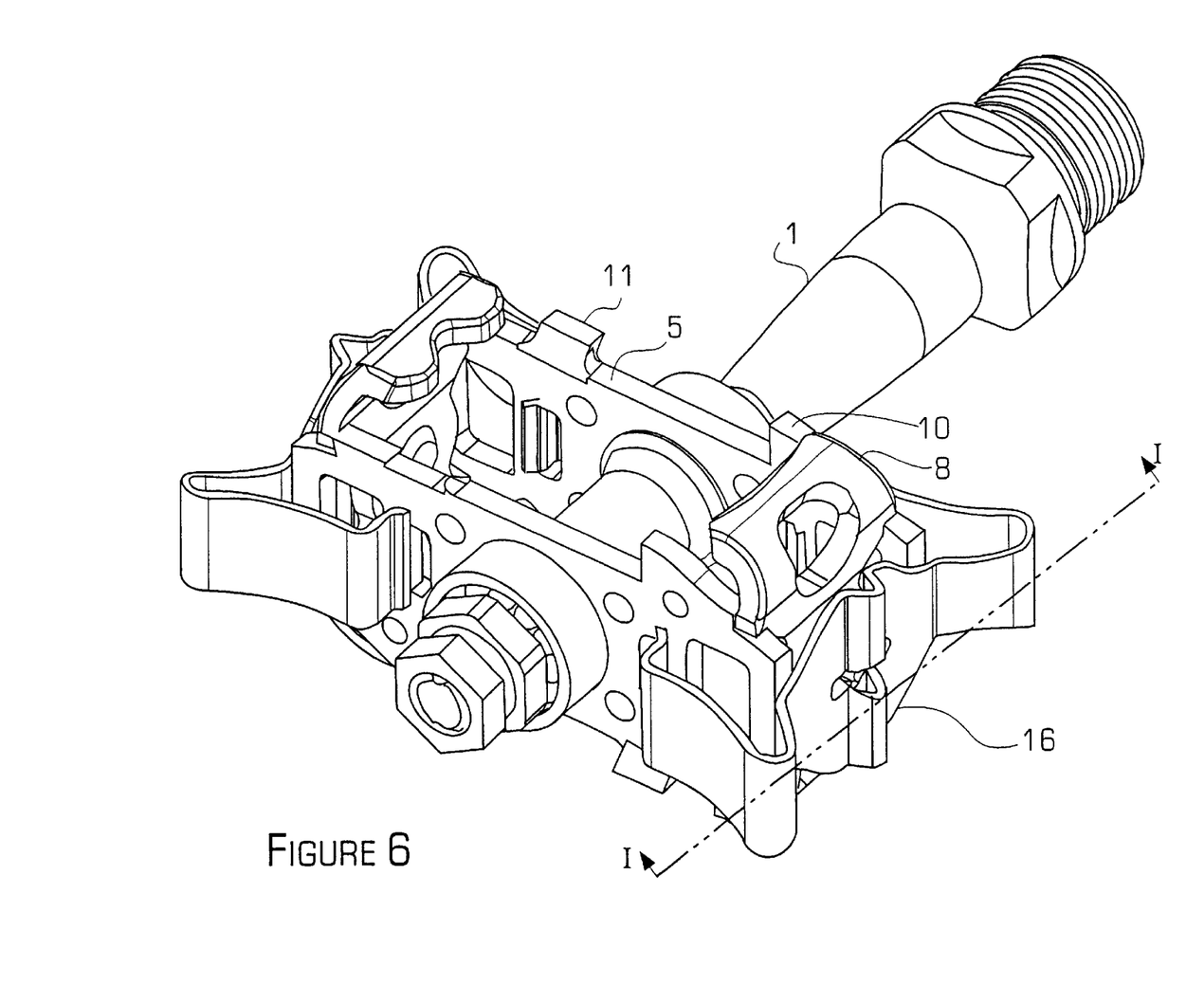
FIG. 6 is a perspective view of an alternative embodiment of the invention pedal.

The lever members 10 may either be in the same plane as the frame member, as shown in FIG. 6, or may be generally curved in a direction parallel to the pedal surface, and perpendicular to the plane of the frame member, either inwardly towards each other or outwardly away from each other, as shown in FIG. 1.

The lever members act as a point of leverage against which a cleat is pushed when the rider is attempting to disengage the cleat from the pedal. As an attempt is made to disengage the cleat, the cleat is twisted to either side by the movement of a rider's foot, additionally coming into contact with one of the resist members 11. The resist members prevent the cleat from becoming unintentionally disengaged as it requires some additional amount of force to push past the resist members and actually disengage the cleat from the pedal. The resist members 11 may be disposed at an angle in relation to the plane of the frame member (FIG. 2). The angles may be either the same or different for the resist member on each frame member. Depending on the angle of the resist member, it requires more or less force to disengage the cleat. A smaller angle requires that more force be applied for disengagement, while a larger angle requires less force.

The movement of a shoe cleat in the process of disengagement additionally causes the cleat to exert force on the moveable clamp member, which pivots in response to the force. The inner surface of the inwardly curving clamping means 8 slides across an upwardly extending portion 12 of the frame member in an arc-like way creating a jaw-like movement of the clamping member.

The pedal body is further comprised of urging means disposed against a clamp member so that it contacts the central contact surface of that clamp member for urging the clamp member inward. The urging means generally provides an elastic adjustable pressure against the clamp member and may comprise a spring or an elastomeric material such as a urethane.

Figure 4:
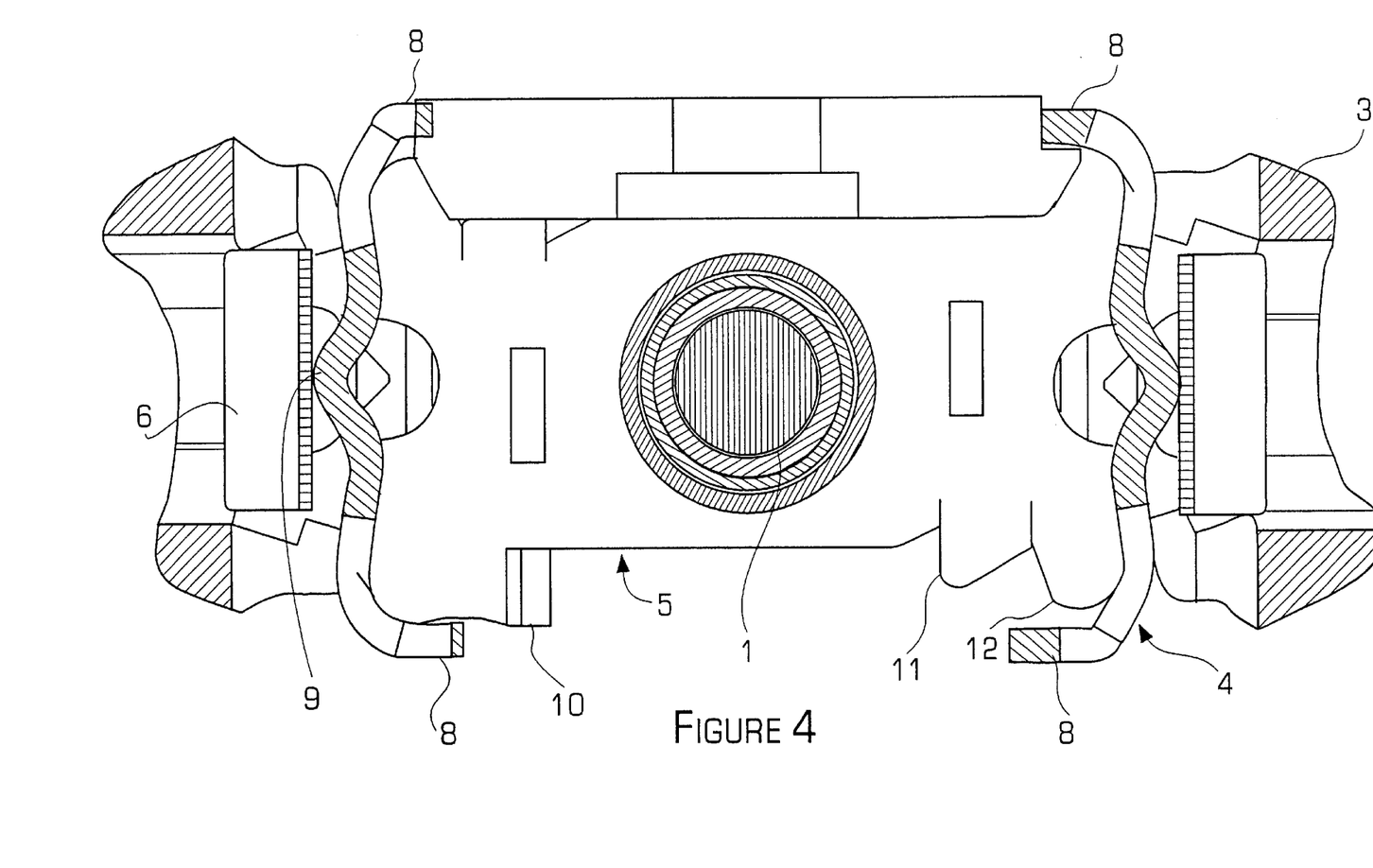
FIG. 4 is a cross-sectional view of the pedal taken along line 4—4 of FIG. 1.

In a preferred embodiment the urging means is a spring, preferably a bridge spring 6. The bridge spring may comprise a central U-shaped portion which 22 contacts the clamp member at the central contact surface 9. The contact may be at one point (FIG. 4) or at least two points (FIG. 6). The bridge spring may additionally comprise inwardly-curving wing portions 24 as shown in FIGS. 2 and 6. In the embodiment shown in FIG. 6, the ends of the inwardly-curving wing portions of the bridge spring 16 come into contact with the frame members.

Figure 5:
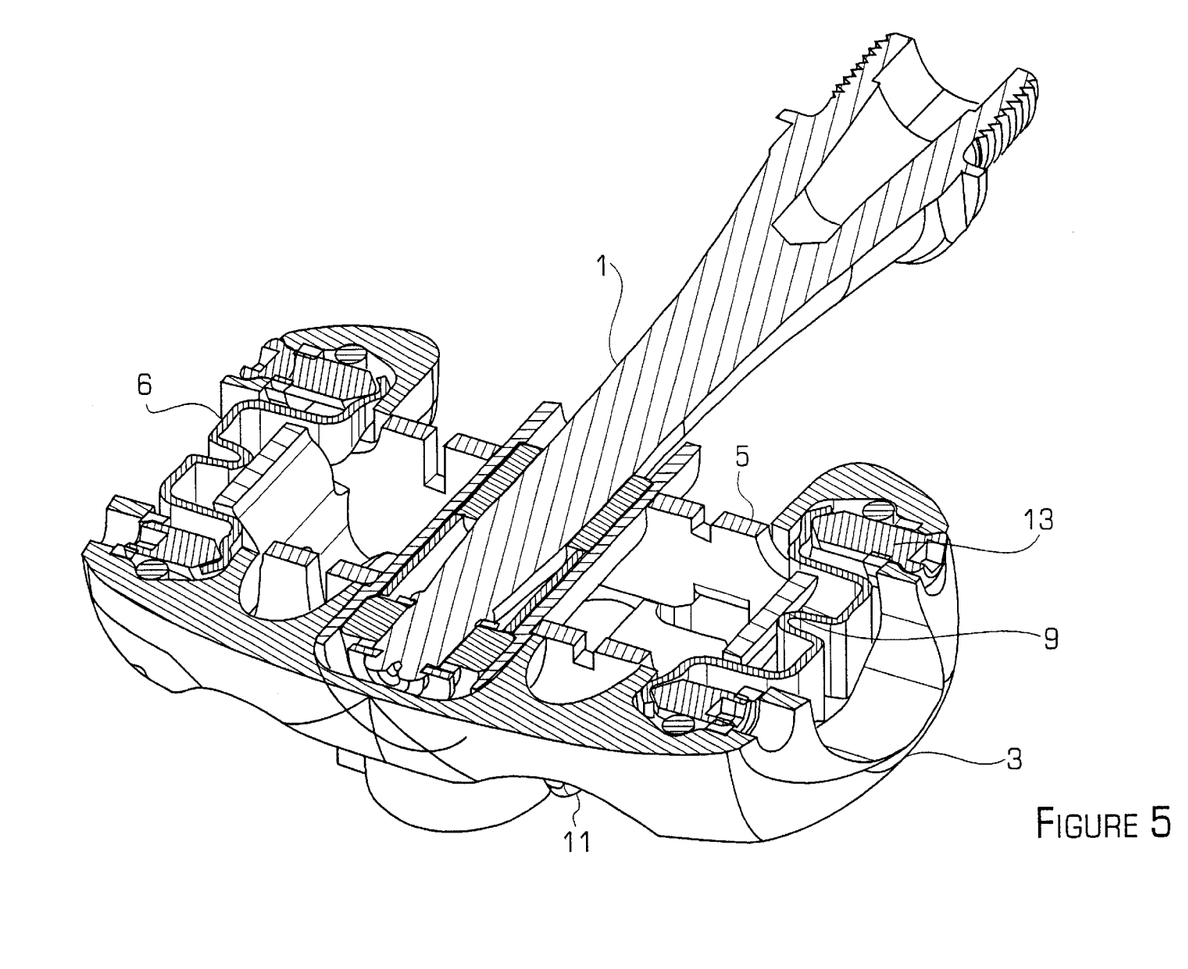
FIG. 5 a transverse sectional view of the pedal taken along line 5—5 of FIG. 1.
Figure 7:
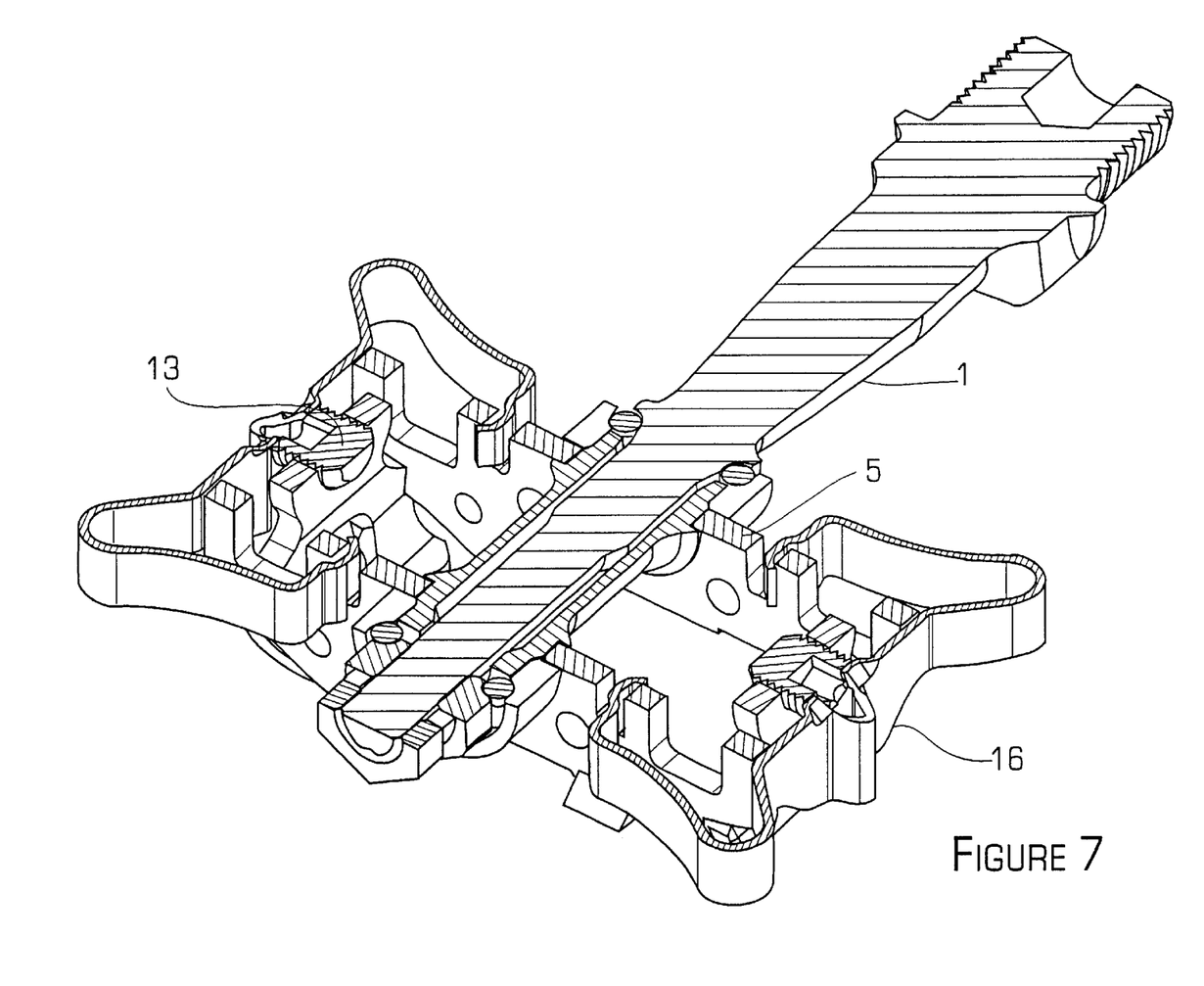
FIG. 7 is a perspective view of the embodiment shown in FIG. 6 along the line 7—7.

The pressure exerted by the bridge spring on the clamp member is modulated by a tension adjustment means, which in the preferred embodiment comprises one or more tension adjustment screws 13 for each bridge spring, each of which is separately adjustable. In one embodiment, as shown in FIG. 5, each bridge spring 6 has two tension adjustment screws, threaded through the housing, which may come into contact with each of the inwardly-curving wing portions and create pressure thereon. In an alternative embodiment, shown in FIG. 7, each bridge spring 17 has one tension adjustment screw located in the center of the bridge spring and threaded through either the bridge spring itself or the central portion of the clamp member.

The rider can adjust the tension adjustments screws to regulated the amount of force necessary to move the clamp members while engaging a cleat. In conventional pedals, engagement of a cleat to the pedal is a two step process. First a front (toe end) portion of a cleat is hooked under a curved portion of a fixed front clamp, then the rider exerts a downward pressure on the back (heel end) end of the cleat to move a moveable tensioned clamp member aside and allow the engagement of the cleat. In the invention pedal disclosed herein, the engagement process is greatly simplified as the pivotability of both clamp members allows a cleat to become engaged with a single step of applying a downward pressure on the cleat while resting against the clamp members of the invention pedal.

While the foregoing has been with reference to particular embodiments of the invention, it will be appreciated by those skilled in the art that changes in these embodiments may be made without departing from the principles and spirit of the invention, the scope of which is defined by the appended claims.

What is claimed:

1. A bicycle pedal comprising
   a pedal body rotatably supported by a pedal shaft, the pedal body having planar pedal surfaces;
   a pivotable clamp member substantially perpendicular to the surfaces of pedal, the clamp member having a lengthwise end which extends out from the planar pedal surface and which comprises
   a central contact surface and
   clamping means located at the lengthwise end of the clamp member for clamping to a cleat, the clamping means further providing a slideable guided surface acting to perform a clamping movement; and
   urging means disposed against the central contact surface of the clamp member for urging the clamp member inwardly so as to engage the cleat, the urging means further comprising means of providing an elastic adjustable pressure against the clamp member further comprising a bridge spring having a central u-shaped portion and inwardly-curving wing portions.

2. A bicycle pedal according to claim 1 wherein the pedal comprises plural pivotable clamp members.

3. A bicycle pedal according to claim 1 wherein the clamp member is a single unit.

4. A bicycle pedal according to claim 1 wherein the pivotable clamp member has an arch-shaped central portion oriented parallel to the pedal surface, the central contact surface is disposed in the center of the arch-shaped central portion.

5. A bicycle pedal according to claim 1 wherein the clamp member comprises clamping means at longitudinal ends of the member such that the clamping means extends from opposite pedal surfaces.

6. A bicycle pedal according to claim 1 wherein the clamping means is notched.

7. A bicycle pedal according to claim 1 further comprising tension adjustment means for adjusting the pivotability of the clamp member.

8. A bicycle pedal according to claim 7 wherein the tension adjustment means comprises one or more tension adjustment screws.

9. A bicycle pedal according to claim 8 wherein there are a plurality of tension adjustment screws which are separately adjustable.

10. A bicycle pedal according to claim 9 wherein the tension adjustment screws separately contact each end of the wing portions of the bridge spring.

11. A bicycle pedal according to claim 8 wherein the tension adjustment screws contact the center portion of the bridge spring.

12. A bicycle pedal comprising a pedal body rotatably supported by a pedal shaft, the pedal body having planar surfaces and comprising a housing;

frame members disposed inside the housing, the frame members being oriented parallel to longer ones of the sides of the housing;

a plurality of clamp members, at least one of which is pivotable, the clamp members each being a single unit oriented substantial perpendicular to the planar surfaces of the pedal body and having a central contact surface and clamping means located at a lengthwise end of the clamp member, the clamping member extending outwardly from a surface plane of the pedal surface, the clamping means further providing a central contact surface and the clamping means providing a slideable guided surface acting to perform a clamping movement;

urging means disposed against the clamp member to contact the central contact surface of the clamp member for urging the clamp member inward, wherein the urging means comprises a shaped bridge spring comprising a deep central u-shaped portion and downwardly-arching inwardly-tapering wing portions; and a tension adjustment mechanism comprising one or more separately adjustable tension adjustment screws adjusting the tension of the urging means.

13. A bicycle pedal according to claim 12 wherein the housing is plastic.

14. A bicycle pedal according to claim 12 wherein the housing is metal.

* * * * *